United States Patent [19]

Bossard

[11] Patent Number: 4,744,910

[45] Date of Patent: May 17, 1988

[54] ELECTROSTATIC FILTER

[75] Inventor: Peter R. Bossard, Langhorne, Pa.

[73] Assignee: Voyager Technologies, Inc., Langhorne, Pa.

[21] Appl. No.: 3,324

[22] Filed: Jan. 14, 1987

Related U.S. Application Data

[63] Continuation-in-part of Ser. No. 855,071, Apr. 22, 1986.

[51] Int. Cl.$^4$ .......................... B03C 5/02; B03C 3/41; B03C 3/45; B01D 50/00

[52] U.S. Cl. .......................................... 210/748; 55/2; 55/123; 55/146; 55/151; 55/155; 55/DIG. 38; 204/186; 204/302; 210/243

[58] Field of Search ...................... 55/2, 123, 126, 146, 55/150, 151, 152, 155, 156, DIG. 38; 210/748, 243; 204/149, 186, 302

[56] References Cited

U.S. PATENT DOCUMENTS

| | | | |
|---|---|---|---|
| 1,325,124 | 12/1919 | Strong | 55/155 X |
| 1,333,790 | 3/1920 | Bradley | 55/152 X |
| 1,393,712 | 10/1921 | Steere et al. | 55/123 X |
| 1,650,097 | 11/1927 | Schmidt | 55/155 X |
| 2,665,246 | 1/1954 | Bates | 204/302 X |
| 2,979,158 | 4/1961 | Vlier, Jr. | 55/126 X |
| 3,585,122 | 6/1971 | King | 204/186 X |
| 3,724,174 | 4/1973 | Walkenhorst | 55/123 |
| 3,801,492 | 4/1974 | King | 204/302 |
| 3,972,800 | 8/1976 | King | 204/302 |
| 4,073,712 | 2/1978 | Means et al. | 204/149 X |
| 4,435,195 | 3/1984 | Testone | 55/126 |
| 4,477,263 | 10/1984 | Shaver et al. | 55/126 X |

FOREIGN PATENT DOCUMENTS

| | | | |
|---|---|---|---|
| 260185 | 5/1913 | Fed. Rep. of Germany | 55/123 |
| 691188 | 10/1979 | U.S.S.R. | 210/243 |

*Primary Examiner*—Kathleen J. Prunner
*Attorney, Agent, or Firm*—Nixon & Vanderhye

[57] ABSTRACT

An improved electrostatic fluid filter is disclosed which is particularly useful in high performance clean rooms for the semiconductor industry. The electrostatic fluid filter is tubular in design and has an inlet port for supplying fluid (e.g., liquid, air) to be filtered and an output port from which relatively pure fluid flows. The filter includes a high voltage conductor which is disposed along the axis of the tube and which is surrounded by a ridged polytetrafluoroethylene insulator. Fluid is directed along the length of the filter parallel to the conductor. Contaminating particles in the fluid are transformed into electrical dipoles and are attached to the high voltage conductor.

16 Claims, 3 Drawing Sheets

FIG. 1
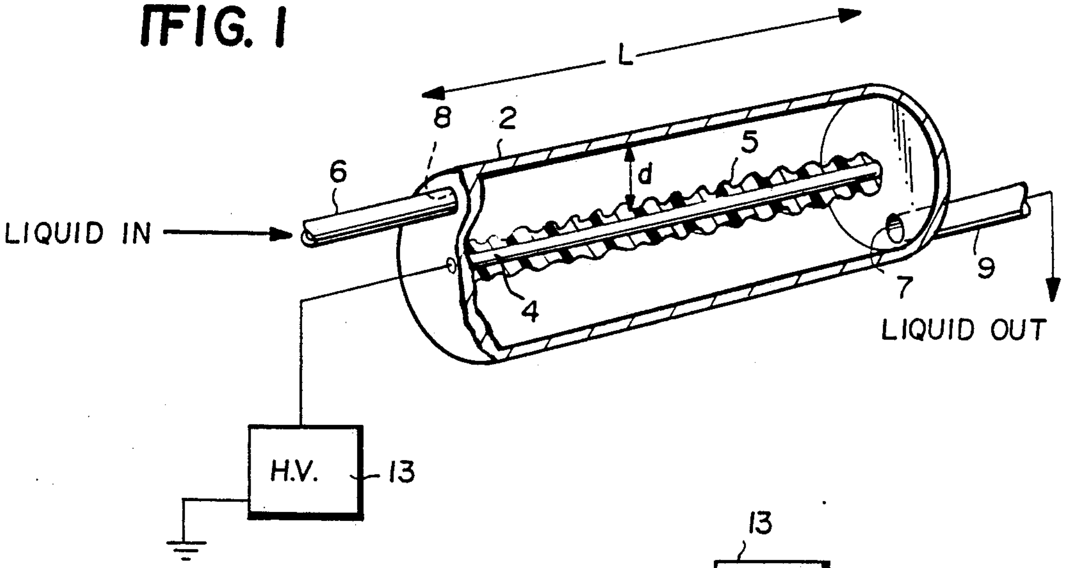
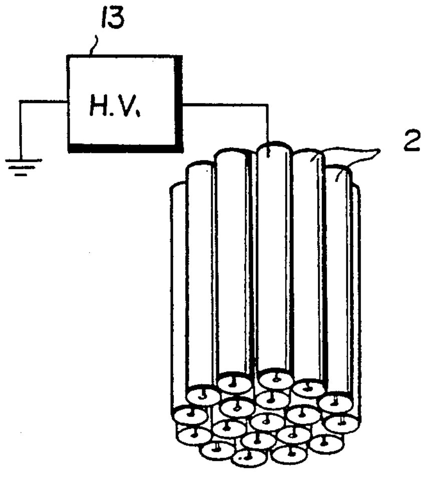
FIG. 2
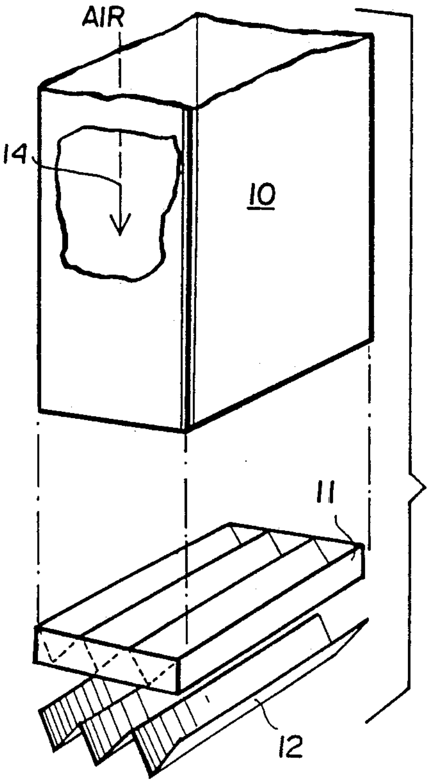
FIG. 3

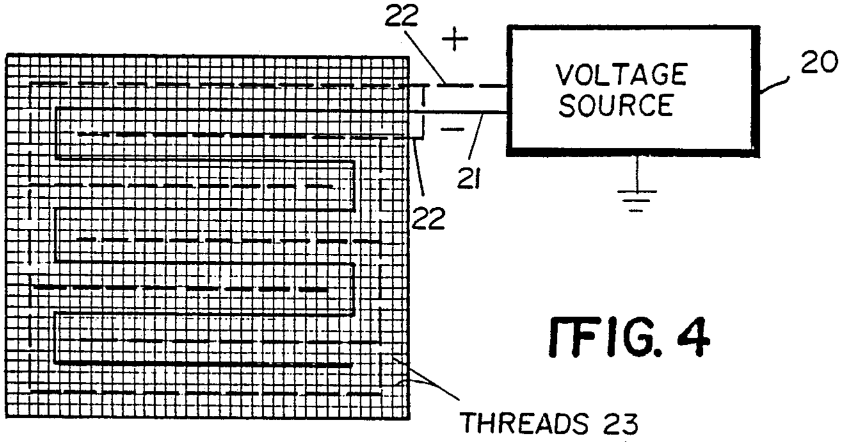
FIG. 4
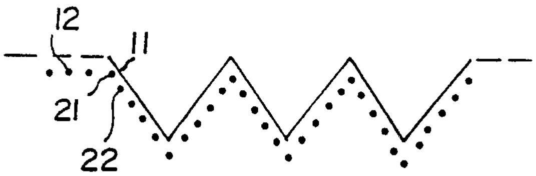
FIG. 5
FIG. 6
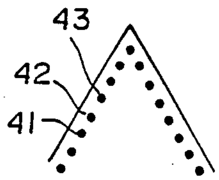
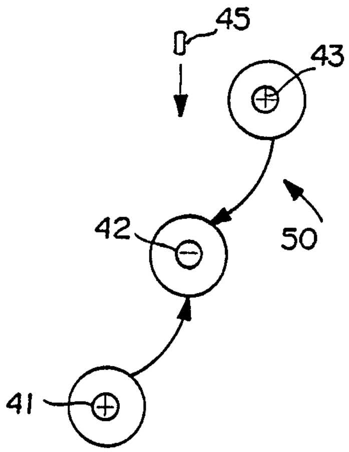
FIG. 7
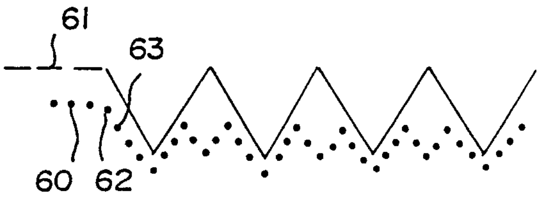
FIG. 8

ELECTROSTATIC FILTER

CROSS-REFERENCE TO RELATED APPLICATION

This is a continuation-in-part of application Ser. No. 855,071 filed Apr. 22, 1986 pending.

FIELD OF THE INVENTION

This invention relates to electrostatic filters and more particularly to electrostatic filters which operate on either air or liquids to trap exceedingly small particles.

BACKGROUND AND SUMMARY OF THE INVENTION

Electrostatic filters are well known in the art both for home and industrial use. Such filters typically employ wires which are maintained at a high potential and are designed to trap particles in the air. These filters have been used in conjunction with mechanical filters designed to trap particles of relatively gross size. Particles of a smaller size are then passed through an electrostatic filter which is located at a point downstream with respect to the air flow. Filter systems of this type are found in many forced air systems for home use and in clean rooms used, for example, in semiconductor manufacture.

In the semiconductor industry particularly, the demand for systems which remove smaller and smaller particles from the air is acute. This requirement arises from the fact that as integrated circuits are made smaller and smaller, they suffer increasingly significant damage from airborne contaminants of smaller and smaller size. These contaminants decrease yields of semiconductor devices and thus increase cost. The elimination of smaller and smaller airborne particles is a major concern to the semiconductor industry.

In the semiconductor industry, besides elimination of small airborne particles, it is likewise a major concern to be able to eliminate contaminants from the various liquids which are utilized in the semiconductor manufacturing process. While it is of course necessary not to obstruct air flow in an air filter, it is perhaps even more important not to obstruct fluid flow in a liquid filter.

In the prior art, materials which have been used for liquid filters (e.g., in the integrated circuit arts) tended to block the flow of liquid and further tended to clog. Such prior art filters for liquids relied on the mechanical process of driving the liquid through a relatively fine mechanical mesh. Contaminating particles larger than the openings of the mesh would be mechanically trapped therein. The accumulation of particles on such a mesh screen would create a large pressure drop at the filter and a great deal of wear and tear on the filter. Such wear and tear on the filter can destroy parts of the filter which in turn can create still further contaminating particles. In addition, such prior art mesh filters were inadequate for capturing very small particles. The clogging of such filters resulted in having to frequently change such filters. Additionally, the clogging of such filters often created a deleterious back pressure in the system.

The present invention provides a filter which exhibits very little resistance to the material moving through it and yet is extremely effective in removing particles from the material. The present invention also provides a filter which is useful in the process of manufacturing integrated circuits and other products to eliminate contaminating particles from liquids which are used in the manufacturing process, e.g., any chemicals which are to come into contact with an integrated circuit wafer. The present invention still further provides such a liquid filter which has relatively large holes within it for permitting the liquid to flow easily therethrough while destroying the contaminating particles within the liquid. The improved electrostatic fluid filter of the present invention is tubular in construction and has an inlet port for supplying fluid to be filtered and an output port from which relatively pure fluid flows. The filter includes a high voltage conductor which is disposed along the axis of the tube and which is surrounded by a ridged insulator. Fluid is directed along the length of the filter parallel to the conductor. Contaminating particles in the fluid are transformed into electrical dipoles and are attracted to the high voltage conductor.

BRIEF DESCRIPTION OF THE DRAWINGS

FIG. 1 is a perspective sectional view of an exemplary liquid filter according to the present invention.

FIG. 2 is a perspective view of an exemplary air filter according to the invention.

FIG. 3 is an exploded view of an air delivery system partially cut away showing the position of another exemplary filter therein.

FIG. 4 is a schematic representation of the wires of one of the filters of FIG. 3.

FIGS. 5 and 6 are cross sections of a fragment of the filter of FIG. 3.

FIG. 7 is an enlarged cross sectional view of adjacent wires of the fragment of FIG. 6.

FIG. 8 is a cross sectional view of an alternative filter of the type useful in the air delivery system of FIG. 3.

DETAILED DESCRIPTION

Figure 9:
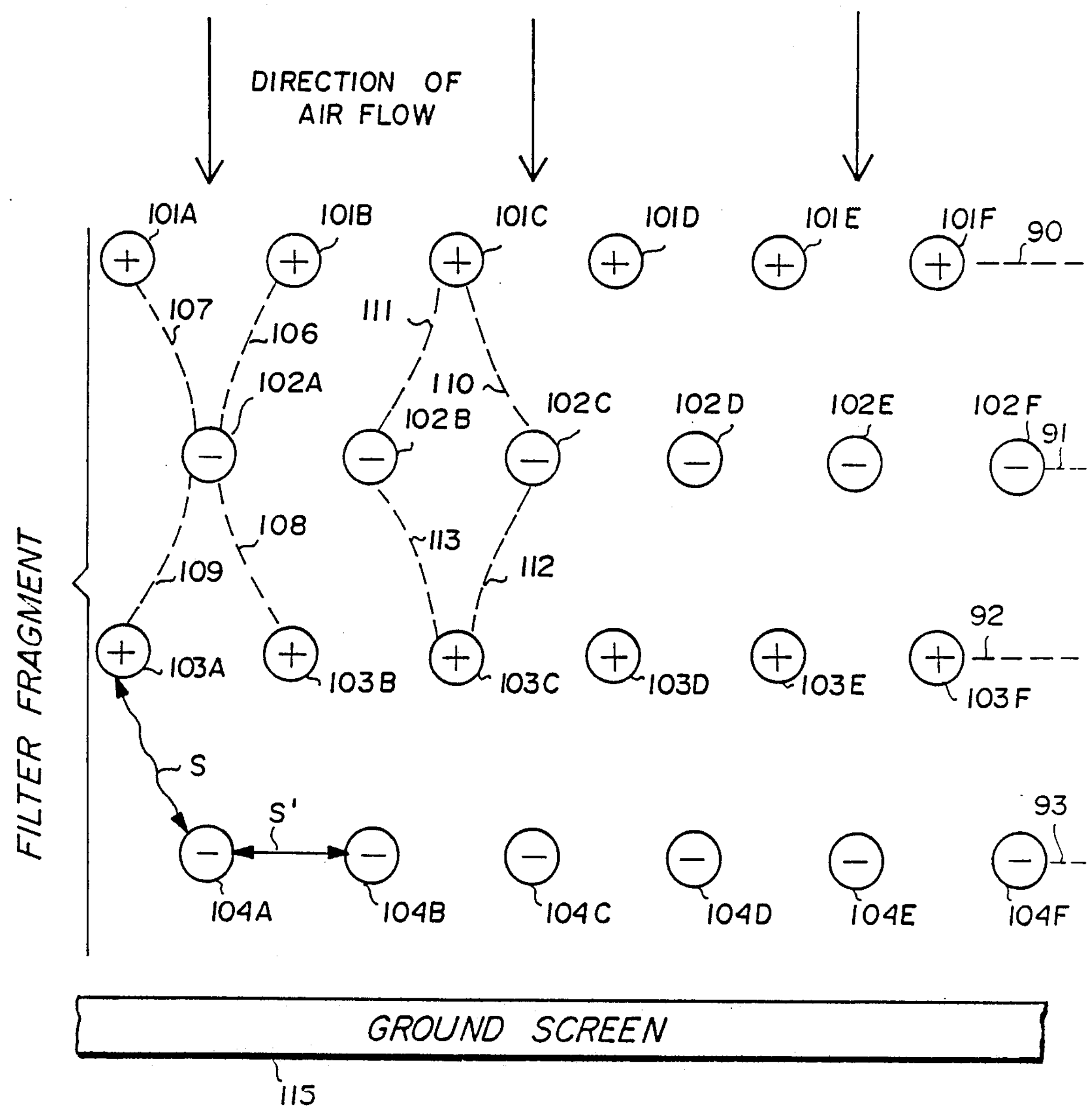
FIG. 9 is a cross sectional view of a further alternative filter embodiment.

The liquid filter shown in FIG. 1 is designed to filter out any type of impurity which may have contaminated the liquid during processing. Contaminants may be present in a liquid in the form of dust particles, flakes of tubing through which the chemical is being transported or from a variety of other contaminating sources.

The filter shown in FIG. 1 is in the form of a tubular housing 2 having a length L and a diameter d. Liquid is carried to the filter by a conduit 6 which leads to an inlet port 8. At the filter outlet is an outlet port 7 which leads to conduit 9. Along the axis of the tubular filter is a conductor 4 which is surrounded by a ridged insulator 5. The ridges in the insulator assist in the trapping of particles. The insulator is preferably constructed of polytetrafluoroethylene (Teflon). Wire 4 is connected to a high voltage source 13.

High voltage source 13 is preferably an AC voltage source, however, a DC source may be used in some cases as well. Polytetrafluoroethylene is preferred as an insulator because it has a very high dielectric strength. In addition, polytetrafluoroethylene tends not to flake, and hence will tend not to introduce further contaminants into the liquid. Moreover, polytetrafluoroethylene tends to be resistant to many of the caustic chemicals which are utilized in the integrated circuit fabrication process.

The electrostatic filter of FIG. 1 operates based on its ability to turn contaminating particles into electrostatic dipoles and to pull such dipoles onto the high voltage conductor which is at the center of the tube. Within the tubular structure, the electric field created by high voltage conductor 4 will be different on each side of any given particle. In the tubular structure shown in FIG. 1, a non-zero electric field gradient is achieved due to the decreasing nature of the electric field the further away a particle is from the axis of tube 2, i.e., from conductor 4.

In FIG. 1, the length of the tube as well as its diameter is shown only in terms of length L and diameter d. It is noted that the actual length of the tube and the diameter of the tube as well as the voltage applied to conductor 4 will vary depending upon the nature of the liquid which is being filtered and the rate at which the liquid is being moved through the filter. These parameters will be varied depending on the viscosity of the fluid and the speed of the fluid.

The speed of the fluid will, in part, determine the length of time that the dipole, i.e., the contaminating particle, will be exposed to the electric field. Thus, if a particle is moved through the filter too fast, it may be swept through the filter before the electric field has an opportunity to operate on it and pull it into the high voltage conductor. It is noted that particles being attracted to the conductor 4 will experience a greater attractive force the closer the particle comes to the conductor, because the force on the dipole increases as it gets closer to conductor 4. With regard to the high voltage source 13, the actual voltage applied to conductor 4 may be a value between, for example, 100 and 10,000 volts depending upon how fast it is desired for the particles to be pulled into the conductor, the nature of the liquid which is being filtered and the rate of fluid flow. It is preferred that the high voltage source be an AC source having a DC component.

In view of the above description of the forces which are at work within the tube, it will be apparent to one of ordinary skill in the art how to routinely select appropriate values for the high voltage, the length of the tube as well as the diameter of the tube for a particular liquid to be filtered in order to insure that contaminating particles which are travelling down the tube at a known velocity will be pulled in towards the conductor and will be trapped before the liquid passes out the end of the tube. In this manner, the artisan will be able to insure that only relatively pure liquid goes out of the tube.

The liquid filter of the present invention may be used in conjunction with, for example, a recirculating bath that is used in the semiconductor industries in processes for manufacturing integrated circuits. Of course, if a fixed storage drum is used to house chemicals used in a given manufacturing process, the present invention can be used in combination with such a storage drum.

The above-described filter operates on the principle that electrostatic fields transform particles into dipoles and if the electric field gradient is non-zero then the particles will be attracted towards the increasing electric field strength. As demonstrated below, this principle can be applied, according to the present invention, to attract contaminating particles which are airborne as well as those which are contaminating a liquid.

FIG. 2 shows a honeycomb array of tubular filters which are similar to the one shown in FIG. 1, but which are disposed in a vertical direction. By way of example only, the tubes shown in FIG. 2 are on the order of a half inch in diameter and include a conductor insulated with Teflon in the manner shown in FIG. 1. Each of the conductors in the honeycombed array will be connected to a high voltage source. This honeycomb array is contemplated to be used in conjunction with a mechanical air filter in, for example, a clean room. By using a mechanical filter, relatively large particles may be filtered out and the FIG. 2 arrangement of filters can be used to filter particles as small as 0.01 microns. The honeycomb array may be of any physical dimensions and, for example, may be on the order of a 2'×4' array of tubes which are approximately half a foot long.

Still further electrostatic filter designs are described below which utilize the principle of transforming contaminating particles into dipoles and attracting such particles to a high voltage conductor. In accordance with the present invention, such an electrostatic filter is positioned in association with a mechanical filter to achieve an optimum filtration of airborne particles.

FIG. 3 shows a further embodiment of the present invention and shows an air duct 10 for supplying air to a clean room. The duct is adapted by brackets (not shown) to accept a mechanical filter 11 and filter 12 in accordance with the principles of this invention. The duct is connected to an air supply adapted to direct the air stream downward as viewed in a direction represented by arrow 14. Thus, if a mechanical filter is to be used, it is placed upstream of the electronic filter unit 12.

A preferred mechanical filter is of the HEPA type. Such filters are commercially available and are corrugated to increase the filter area in the air stream. The construction and physical shape of filter 12 conveniently conforms to the corrugations of the HEPA filter.

Filter 12 conveniently may be thought of as constructed in a plane with two wire loops 21 and 22 each connected between the positive and negative terminal of a D.C. Voltage source 20 electrically in parallel as shown in FIG. 4. The wires of the two loops are interweaved with one another to provide alternate positive and negative polarities on adjacent wires.

The alternating positive and negative polarities on adjacent wires serve to create an electric field gradient. Airborne particles passing through the electric field surrounding these high voltage conductors are converted into dipoles as in the FIG. 1 embodiment. As opposed to the air flowing parallel to the axis of the conductors, in the embodiment which follows, the air flows perpendicularly to the conductor axis.

The wires may serve as a warp into which non conducting fibers may be woven to secure the wires in position. Wire 22 is represented by a broken line solely to indicate that it is different from wire 21. Threads 23 represent the fibers of the woof. Filter 12 preferably is configured such that the plane of FIG. 4, in practice, is constructed to have a corrugated cross section as represented in FIG. 5. It is convenient for the corrugations of filter 12 to be adapted such that filters 11 and 12 mate as shown in FIG. 5. It may even be practical for wires 21 and 22 to be woven into the material of filter 11 in order to achieve a desired close proximity of the two filters. The corrugations of filter 12 are between one half inch to two inches deep, adjacent wires of the filter being spaced apart on two hundred mil centers. Twenty mil insulated wire may be used. Filter 12 is operative to remove particles of from 0.1 microns to 110 microns from the air, generating voltage of about 500 to 4,000 volts with leakage currents of 0.1 microamperes/sq ft dissipating about 0.4 milliwatts of power/sq. ft.

FIG. 6 shows a cross section of a single corrugation of the filter of FIG. 5. Three adjacent turns or legs of wires 21 and 22 are designated 41, 42 and 43 in FIG. 6 and shown enlarged in FIG. 7. In 45 degree corrugations, a particle 45 in FIG. 7 "sees" a spacing 50 between adjacent wires which is about 70 mils or about one third the actual spacing (200 mils) between adjacent wires. Consequently, the particle not only is subjected to high field gradients due to the alternating polarities, but comes relatively closer to the wires than would be the case in a planar arrangement of wires. The increased field gradient and close proximity of the particles to the wires results in the removal of particles down to about 0.01 micron size in response to input of +1000 volts. The system is satisfactory for meeting requirements for better than a class one clean room.

FIG. 8 shows a cross section of an alternative embodiment where filter 60 in accordance with the principles of this invention is adapted to have corrugations of half the period and half the magnitude of the corrugations of a mating mechanical filter 61. Once again, first and second wires 60 and 62 are connected as shown in FIG. 4 in this embodiment also.

In order to achieve operation of like efficiency employing like polarity wires actually operating in a plane, the wires would have to be placed so close together that they would obstruct air flow significantly and at the expense of significantly higher power dissipation.

FIG. 9 shows a cross section of a wire plane like that of FIG. 3 comprising a plurality of wires like 21 and 22 in FIG. 4 in subplanes 90, 91, 92 and 93. The segments of the top one of four representative wires are designated 101A, 101B, 101C, 101D, 101E and 101F in FIG. 9. The plus signs in the circles representing the wire turns or legs indicate that the wire (101) is maintained at a positive potential. The next wire down (102) includes legs 102A, 102B, 102C, 102D, 102E, and 102F (always on even number of segments). The next lower wires (103 and 104) have their respective legs similarly designated. The legs of the planes can be seen to be offset with respect to like-designated legs in the next adjacent plane, adjacent planes being separated a distance about equal to about four times the wire diameter. Multiplane filter configurations of the type shown in FIG. 9 are operative to produce a "vacuum" in the field which is cone-shaped as indicated by broken lines 106 and 107 and 108 ard 109 and by broken lines 110 and 111 and 112 and 113. Notice that the "vacuum" occurs between positively charged segments in the first instance and between negatively charged segments in the second. These cone shapes are analogous to the corrugations achieved with a single plane filter as shown in FIGS. 3 through 8. Of course, a multiplane filter as shown in FIG. 9 is not corrugated to mate with a corrugated mechanical filter.

The distance between a positively charged leg and a negatively charged leg is large compared to the distance between adjacent like-charged legs in FIG. 9. If, for example, the diameter of a leg including the insulation is D, then the distance S between legs of unlike charge is greater than 4D and the distance S' between like-charged legs, is approximately 2D. It is clear that negative particles and positive particles are swept out of respective field vacuums to oppositely charged wire segments. Neutral particles will be less affected by the field vacuum, but will still have some attraction due to electrostatic dipole formation in the particle.

A ground screen is included astride the air flow path further down stream of the filter as represented in the embodiment of FIG. 9 by broken rectangle 115.

While the present invention has been described in terms of its presently preferred form, it is not intended that the invention be limited only by the described embodiment. It will be apparent to those skilled in the art that many modifications may be made which nevertheless lie within the spirit and intended scope of the invention as defined in the claims which follow.

I claim:

1. An electrostatic filter for removing particles from a liquid comprising:

a housing;

an input port in said housing for receiving liquid to be filtered;

an output port in said housing for supplying filtered liquid;

a conductor disposed within the housing, extending at least substantially the length of the housing and being surrounded by an insulator having ridges; and high voltage supply means coupled to said conductor for maintaining said conductor at a high voltage level, so that the contaminating particles in the liquid are transformed into dipoles which are attracted to the conductor.

2. An electrostatic filter according to claim 1, wherein the housing is in the shape of a tube.

3. An electrostatic filter according to claim 2, wherein the conductor is disposed along the axis of the tube.

4. An electrostatic filter according to claim 1, wherein the liquid flows from the input port to the output port along a path substantially parallel to the conductor.

5. An electrostatic filter according to claim 1, wherein said insulator is made of polytetrafluoroethylene.

6. An electrostatic filter according to claim 1, wherein said high voltage supply means is an AC voltage source.

7. An electrostatic filter according to claim 1, wherein said input port and output port are sufficiently large enough to only minimally impede liquid flow through the filter.

8. In an electrostatic filter having an elongated housing provided with an input port, an output port and a conductor disposed within and along substantially the entire length of the housing, a method for removing particles from a liquid comprising the steps of:

maintaining the conductor at a high voltage level;

supplying liquid to be filtered to the filter input port;

driving the liquid generally parallel to the length of the conductor from the input port to the output port, so that contaminating particles in the liquid are transformed into dipoles and are attracted to the high voltage conductor; and surrounding the conductor with an insulator having ridges.

9. A method according to claim 8, further including the step of adjusting at least one of: the length of the filter; a diameter of the filter; and/or the voltage applied to the conductor, depending upon the characteristics of the liquid being filtered.

10. A method according to claim 8, wherein the filter housing is in the shape of a tube and the method further includes disposing the conductor along the axis of the tube.

11. A method according to claim 8, wherein the step of supplying liquid includes the step of receiving liquid to be used in the manufacturing process of an integrated circuit, and further including the step of utilizing the filtered liquid from the output port in the integrated circuit manufacturing process.

12. A method according to claim 8, wherein the step of maintaining the conductor at a high voltage includes the step of coupling the conductor to an AC voltage source.

13. An electrostatic filter system for removing particles from a fluid passing therethrough comprising:

an m×n array of interconnected filter elements, wherein m and n are non-zero integers;

each of said filter elements including: an elongated housing having an input port for receiving fluid to be filtered, and an output port for supplying filtered fluid; a conductor disposed within the housing extending at least substantially the length of the housing;

high voltage supply means coupled to each of said conductors in said array; and a mechanical air filter disposed upstream of said input port such that said fluid is initially filtered by said mechanical filter to eliminate large fluid particles and said initially filtered fluid is further filtered by said array of filter elements to remove relatively fine fluid particles, said mechanical filter being a HEPA filter.

14. An electrostatic filter system according to claim 15, wherein each filter element housing is shaped in the form of a tube and wherein the conductors are disposed along the axis of the tubes.

15. An electrostatic filter system according to claim 14, wherein said array of filter elements is vertically mounted.

16. An electrostatic filter comprising means for defining a flow path of fluid to be filtered; and a conductor disposed within said defining means generally along said flow path, said conductor surrounded by a ridged insulator, the ridges being formed and spaced so as to facilitate the trapping of particles.

* * * * *